United States Patent Office 3,388,106
Patented June 11, 1968

3,388,106
COPOLYMERS OF MALEIC COMPOUNDS AND MONOETHYLENICALLY UNSATURATED MONOMERS AND METHOD OF PREPARING
Irving E. Muskat, Miami, Fla., assignor, by mesne assignments, to Sinclair Research, Inc., a corporation of Delaware
No Drawing. Filed Aug. 8, 1961, Ser. No. 129,990
19 Claims. (Cl. 260—78.5)

The present invention relates to copolymers of maleic compounds with monoethylenically unsaturated monomers having a strong tendency to heteropolymerize with maleic compounds, e.g., normally to form polymers in which the mol ratio of the maleic compound to the other monomer is about 1:1. More particularly, the invention relates to copolymers of the monoethylenically unsaturated monomers indicated above which copolymers contain at least about 2 mols of monoethylenically unsaturated monomer per mol of maleic compound. These new copolymers are produced in the substantial absence of homopolymer components. The invention includes partial and complete esters of such copolymers with monohydroxy compounds, especially aliphatic alcohols, as well as mixtures of such copolymers or certain partial esters thereof with polyhydric compounds. The monoethylenically unsaturated monomers having a strong tendency to heteropolymerize with maleic anhydride are referred to hereinafter as heteropolymerizing monomers. The invention also includes processes in which an excess of heteropolymerizing monomer is completely consumed in the copolymerization reaction.

The copolymer products of the invention are preferably copolymers of monovinyl aromatic compounds with maleic anhydride, typified by copolymers of styrene and maleic anhydride.

Copolymerization of styrene and maleic anhydride is well known. However, these monomers are well known to possess a very strong tendency to heteropolymerize providing products in which the monomers are present in a mol ratio of substantially 1:1. From the standpoint of scientific curiosity, studies have been made of the styrene-maleic anhydride copolymerization using very large excesses of styrene. It was found that less than 2 mols of styrene per mol of maleic anhydride could be forced into the copolymer molecule.[1] Moreover, copolymers containing the most styrene were obtained at an intermediate level of styrene monomer excess, establishing the impracticality of forcing more styrene into the copolymer. Other efforts to incorporate larger proportions of styrene have been made, but these have employed procedures in which the resulting product is a mixture of interpolymer of styrene and maleic anhydride with styrene homopolymer. It is also known that the copolymerization under consideration is highly exothermic with the rate of reaction increasing with increasing temperature. Thus, from the standpoint of safety, the art has hesitated to proceed using the elevated reaction temperatures which have been found necessary in the invention.

In accordance with the invention, it has been found when the copolymerization is conducted at elevated temperatures of about 120–140° C. or higher, that proportions of heteropolymerizing monomer, above a stoichiometric ratio of 1:1 with respect to the maleic compound, can be forced into the copolymer molecule. Indeed, at temperatures of about 140° C. or higher, the heteropolymerizing monomer and the maleic compound will form copolymers which correspond in composition with the proportions of monomers employed providing new copolymers substantially free of homopolymer and the heteropolymerizing monomer is substantially completely consumed in the copolymerization reaction.

[1] J. Am. Chem. Soc., November 1945, page 2045.

The minimum temperature which can be employed in accordance with the invention will vary with the proportion of excess heteropolymerizing monomer which is employed and also with the yield which is considered to be acceptable under the circumstances of reaction. Thus, when forming a copolymer of styrene and maleic anhydride of mol proportions of 2:1, the yield begins to recrease as the temperature of reaction is lowered to 130° C. and the yield becomes poor below 120° C. Similarly, the acid number of the copolymer product which is indicative of the proportion of styrene in the copolymer becomes higher as the temperature is decreased below 140° C. Similarly, when reacting 3 mols of styrene with 1 mol of maleic anhydride, the yield begins to drop off as the temperature of reaction is lowered below 140° C. and the acid number of the copolymer product becomes progressively higher as the reaction temperature is decreased below 140° C.

Preferred copolymers in accordance with the invention contain from about 2 to about 20 mols of copolymerized heteropolymerizing monomer per mol of maleic compound. Substantially complete consumption of excess monomer is also of importance. Thus, from the standpoint of process, the invention is of value when the mol ratio exceeds 1.2:1.0.

It is desired to emphasize that the copolymerization must be conducted at the elevated temperature and this requirement is not satisfied by merely heating a solution mixture of styrene and maleic anhydride (regardless of the proportion of styrene present) to the temperatures which are used in the invention. In such instances, the styrene and maleic anhydride react to form a heteropolymer during the period of heating so that, by the time the reaction temperatures required in the invention are reached, the maleic anhydride is consumed to form a heteropolymer. Thereafter, and assuming the presence of excess styrene, styrene homopolymers may be formed if peroxide is still present in the system (otherwise styrene monomers will remain). The styrene homopolymer does not co-react with the heteropolymer as is evidenced by the fact that the heteropolymer may be recovered by dissolving the same in aqueous alkaline medium leaving the polystyrene undissolved. Using the above process, the heteropolymer formed during the low temperature heating up period has a relatively high molecular weight, even when acetone is used, which, in accordance with the present invention will produce copolymers of very low molecular weight.

The copolymers of the invention are provided by copolymerization of maleic compound and ethylenically unsaturated monomer having a strong tendency to heteropolymerize therewith, these being typically illustrated by monovinyl aromatic compounds. Desirably, the maleic compound is a maleic anhydride.

The term "maleic anhydride" identifies anhydrides having the formula:

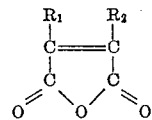

in which R and $R_2$ are selected from the group of hydrogen, alkyl, aryl and aralkyl radicals containing up to 8 carbon atoms, and halogen. Thus, maleic anhydride, methyl maleic anhydride, phenyl maleic anhydride, dimethyl maleic anhydride and chloromaleic anhydride are particularly contemplated. Maleic anhydride is preferred.

Various vinyl aromatic monomers may be used, especially styrene and vinyl toluene, but other substituted styrenes may be used such as ring-alkylated styrene compounds such as the vinyl xylenes, and p-isopropyl styrene, these being illustrative of $C_1$–$C_4$ alkyl-substituted products. Halogen-substituted styrenes may also be used in which up to five of the nuclear hydrogen atoms are replaced by chlorine, fluorine, or other halogen. While the invention is primarily directed to styrene and ring-substituted styrene, other monoethylenically unsaturated compounds having a strong tendency to heteropolymerize with maleic compounds, especially maleic anhydride, may be used, such as vinyl alkyl ethers illustrated by vinyl methyl ether and vinyl butyl ether, vinyl acetate, and acrylate and methacrylate esters such as ethyl acrylate and methyl methacrylate, and olefins such as ethylene and propylene.

The copolymerization process in accordance with the invention is a solvent solution copolymerization in an organic solvent. The solvent may be inert with respect to the monomers and copolymer product, such as benzene or biphenyl, or it may be selected to include an active hydrogen atom enabling a chain-terminating function such as cumene, cymene, acetone, methyl ethyl ketone or methyl isobutyl ketone which permit the production of copolymers of minimum molecular weight. Thus, while low molecular weight is a feature of the invention, the invention is not so-limited and relatively high molecular weight copolymers may also be produced.

In the solution copolymerization process, it is essential that the monomers be soluble in the solvent medium under the conditions of the reaction. On the other hand, it is not essential that the copolymer product be soluble in the selected organic solvent. In the preferred aromatic hydrocarbon solvent media, the solubility of the copolymers increases with the proportion of styrene or substituted styrene which is present therein. Moreover, solubility also increases as the temperature of reaction is increased. Accordingly, as larger proportions of styrene or substituted styrene are used and as one proceeds in the more preferred direction of higher copolymerization reaction temperatures, the proportion of copolymer product which is soluble in the reaction medium at the temperature of reaction is noticeably increased. When the copolymerization reaction has terminated and the reaction mixture is cooled, much of the copolymer product precipitates. Moreover, evaporation of solvent, as by distillation, enables more complete recovery of the copolymer product. In ketone solvents, the copolymer product is highly soluble, even at room temperature.

At the elevated reaction temperatures contemplated, practical copolymerization requires the incremental addition procedure disclosed in my copending application Ser. No. 849,704, filed Oct. 30, 1959, now Patent No. 3,178,395, the disclosure of which is hereby incorporated by reference. In the incremental reaction procedure, catalyst and monomer reactants are simultaneously supplied to a reaction vessel containing a portion of the selected solvent at the reaction temperature and at a rate not substantially in excess of the rate of conversion of monomer to polymer. In this manner, a build-up in the concentration of unreacted monomers is avoided, the conversion of monomer to copolymer is extremely rapid and takes place in a solvent medium containing very little monomer, and the danger of explosion which is very great at the reaction temperatures contemplated is also avoided.

The simultaneous supply of catalyst and monomer is preferably effected by addition of a solution containing catalyst and monomer reactants all dissolved in the selected solvent. However, if desired, the monomers can be dissolved in one portion of selected solvent and the catalyst dissolved in a second portion of selected solvent and both solutions supplied simultaneously to the reaction vessel containing selected solvent at reaction temperature. In this way, the monomer-containing solution is more stable and may be supplied at a temperature different from the temperature of the catalyst-containing solution, e.g., the catalyst-containing solution may be supplied at a low temperature where it is more stable and the monomer-containing solution may be supplied at a higher temperature where the selected solvent can tolerate a higher proportion of dissolved monomers. Indeed, in view of the fact that the monomer-containing solution in preferred practice of the incremental addition process is supplied to a large volume of vigorously agitated selected solvent containing a minimum proportion of unreacted monomers and maintained at very elevated temperatures, substantially instantaneous solution of monomers in the selected solvent within the reaction vessel becomes feasible and the monomer-containing solution may contain suspended monomers, particularly suspended maleic anhydride. Indeed, since maleic anhydride is quite soluble in styrene, the maleic anhydride may be dissolved in the styrene and supplied without predissolving of these monomers in the selected solvent. To insure uniform and substantially instantaneous admixture of catalyst in the reaction liquor and as a safety precaution, the catalyst, particularly if it is slow dissolving, is desirably first dissolved in a portion of the selected solvent. Of course, as stated above, the catalyst may be dissolved in the reactive ingredients or added separately but simultaneously to the reaction vessel.

In its preferred form, the invention employs a copolymerization process yielding substantially instantaneous and complete conversion of monomer to polymer, characteristics unique to inorganic solution reactions. Possibly, this instantaneous reaction may be responsible for the incorporation of large proportions of styrene in the copolymer molecule.

The invention is particularly valuable as a means of producing copolymers of very low molecular weight as a result of the high temperatures and catalyst concentrations which are permitted, as for example, low molecular weight copolymers of maleic anhydride and styrene using specific solvents such as cumene and cymene having chain terminating activity.

In accordance with preferred practice of the invention, incremental addition of solutions containing dissolved monomers and free-radical generating catalyst to a portion of solvent or previously reacted solution is effected with the portion of solvent or previously reacted solution maintained at more elevated temperature than is safe if applied directly to the monomer-containing solution. Also, the concentration of unreacted monomers in the reaction vessel is maintained at extremely low levels, e.g., preferably very much less than 1% by weight, based on the reaction liquid, although up to about 3% by weight of unreacted monomers is less desirably tolerated. At the more elevated reaction temperature and particularly in the presence of a high but uniformly distributed proportion of catalyst, polymerization is very rapid and, at the higher temperatures permitted by the invention, is substantially instantaneous. A reaction rate producing a 95% conversion within 1–5 minutes represents a preferred lower limit of reaction rate.

The process of the invention is desirably carried out by first producing a solvent solution containing dissolved olefinically unsaturated compound and maleic anhydride or halogen-substituted maleic anhydride and peroxide polymerization catalyst in which the monomers are substantially unreacted. Thus, a 20% to 50%, or higher, solution of monomers may be provided by mixing maleic anhydride with the selected solvent and warming with agitation to a temperature of 50–55° C. until the maleic anhydride is dissolved. The solution so obtained is then filtered, if necessary, and the monoethylenically unsaturated compounds, e.g., styrene is added with mixing to provide a homogeneous solution containing the desired ratio of monomers. A peroxide catalyst, such as benzoyl peroxide or dicumyl peroxide, is then simply stirred into the solution to dissolve the same easily. These solutions, when maintained at a temperature of 45–50° C., are stable and the monomer reactants remain in solution without polymerizing for a reasonable time, sufficient to permit commercial operation.

Various other organic peroxides such as dilauryl peroxide, ditertiary butyl peroxide, diacetyl peroxide, acetyl benzoyl peroxide, tertiary butyl hydroperoxide, cumene hydroperoxide, etc., may be used as well as other free-radical generating catalysts such as azo compounds illustrated by azodiisobutyronitrile. Concentrated solutions of hydrogen peroxide are also useful.

Catalysts such as acetone peroxide which provide free-radical reactivity and stability at higher temperatures may be used effectively. The preferred aromatic hydrocarbon solvents, such as cumene, may be oxidized under controlled conditions to form peroxides or other free-radicals in situ and such peroxides may in part or in whole replace the peroxides normally used.

The copolymers of the invention may, desirably, be of quite low molecular weight as evidenced by a solution viscosity in 10% solution in acetone of up to 2.0 centistokes, preferably of up to 1.0 centistoke. The language "10% solution" designates 10 grams of copolymer dissolved in acetone to form 100 milliliters of solution. Unless otherwise indicated, solution viscosity is measured at 30° C.

The preferred copolymers may be terminated by a chain terminating solvent which may be an alkyl-substituted aromatic organic compound in which the alkyl-substituent provides an active hydrogen atom. Desirably, the alpha carbon atom is hydrogen-substituted as in an isopropyl substituted benzene. In case of ketone solvents, the terminated group may contain the ketone radical.

The copolymers which are produced contain a plurality of maleic anhydride residues which are subject to esterification, each anhydride group being capable of forming a pair of ester groups upon reaction with monohydroxy compounds, especially monohydric aliphatic alcohol. Since there are usually several anhydride groups per copolymer molecule, the extent of esterification may be expressed as a percentage of half esterification. Thus, esterification of 1 equivalent of anhydride in the copolymer with 0.5 mol of alcohol provides a 50% half-esterification with 1 mol of alcohol provides a 100% half-ester; esterification with 1.5 mols of alcohol provides 150% of half-esterification; and esterification with 2 mols of alcohol provides 200% of half esterification (the bis-ester).

While the partially esterified copolymers employed in the invention are preferably produced by partial esterification of anhydride copolymers, it is possible, though less preferred, to provide the partial esters directly through copolymerization with the heteropolymerizing monomer of a mixture of the desired maleic half- or bis-esters and maleic acid or anhydride.

Similarly, partially esterified copolymers useful in the invention may be produced by copolymerizing the maleic compound with the vinyl aromatic compound copolymerizable therewith in the presence of the esterifying alcohol, conveniently in the presence of the desired proportion of esterifying alcohol. The copolymerization in the presence of alcohol proceeds more satisfactorily than direct copolymerization of the monomers including maleic esters. In this reaction it appears that at least some of the esterification occurs after copolymerization has been completed.

The extent of partial esterification is of secondary significance in the present invention, the contemplated utility frequently determining both the selection of the alcohol and the extent of esterification which is desired. At least 10% of half esterification is prefefrred for plasticizing purposes. Nevertheless, the copolymers are useful without any esterification.

When the copolymer contains more than 2.0, preferably at least 3.0, anhydride groups per molecule, the copolymer may be thermoset by cross-linking reaction with polyhydric alcohols, usually glycols. Cross-linking is similarly feasible when the anhydride groups are hydrolyzed to form a pair of adjacent carboxyl groups, one of which is highly reactive, or when the adjacent carboxyl groups are reacted with volatile bases such as ammonium hydroxide.

When some of the carboxyl reactivity of the coploymer is eliminated as by partial esterification or when the number of anhydride groups is reduced by the presence of a large proportion of styrene in the coploymer molecule, the copolymer may still retain its solubility in aqueous alkaline medium. Thus, partial esterification of at least 10% of half esterification is useful for plasticizing purposes and also for increasing the water resistance of the copolymer in the form of a film. Partial esters which are extensively soluble in aqueous alkaline medium are specifically claimed in my copending application Ser. No. 129,981 now Patent No. 3,342,787 filed of even date herewith.

When free carboxyl reactivity is still further reduced, the copolymers remain useful for application from organic solvent medium or as plasticizers or synthetic resins, especially high molecular weight polyvinyl chloride.

To illustrate the ranges of partial esterification useful for the different purposes, a copolymer of styrene and maleic anhydride in mol proportions of 2:1 (molecular weight of 2000) can be thermoset by reaction with glycol. Half esterification of this copolymer up to 50% and somewhat higher provides partial esters which will still thermoset with glycols. Half esterification of from 80–116% provides thermoplastic products which do not thermoset in the presence of glycols under normal molding conditions but which are, nevertheless, extensively soluble in aqueous alkaline medium. Above 116% of half esterification, aqueous alkaline solubility diminishes and solubility in organic solvents increases. A copolymer of styrene and maleic anhydride in mol proportions of 3:1 (molecular weight of 1500) is still curable with glycol. Half esterification up to 75% and higher can be effected without destroying good solubility in aqueous alkaline medium. With still greater amounts of half esterification, organic solution application is available, etc. However, a copolymer of styrene and maleic anhydride in mol proportions of 3:1 having a molecular weight of 800 does not thermoset with glycol under normal conditions of curing temperature and in the absence of specific catalysts. Partial esters of this copolymer may still be dissolved in aqueous alkaline medium.

While any monohydric alcohol including aromatic monohydric compounds may be used, it is preferred to employ aliphatic alcohols and especially those containing at least 3 carbon atoms in the molecule. While long chain aliphatic alcohols have been used, it is preferred to use a monohydric aliphatic alcohol containing up to 16 carbon atoms in the carbon chain which carries the single hydroxyl group. Monohydric aliphatic alcohols containing at least 3 carbon atoms and from 2–12 carbon atoms in the carbon chain which carries the single hydroxyl group are particularly preferred. Of course, these alcohols may be employed alone or in admixture with one another. While methyl and ethyl alcohols are operative, they are not preferred. The alcohol which is used provides an important plasticizing function and methyl and ethyl alcohols are less satisfactory from this standpoint. On the other hand, long chain aliphatic alcohols produce copolymer esters which are less extensively soluble in aqueous alkaline medium than copolymer esters with short chain aliphatic alcohols. Polyether alcohols are also useful such as the monomethyl and monobutyl ether polyoxyalkylene glycols illustrated by methoxy polyethyene glycol having a molecular weight in excess of 250, more specifically, 300–400.

Among the aliphatic monohydric alcohols containing from 2 to 12 carbon atoms in the aliphatic carbon chain carrying the single hydroxyl group, one may desirably select saturated hydrocarbon radicals containing from 4-8 carbon atoms. These are preferably primary alcohols, including straight chain and branched chain alcohols, but tertiary and secondary alcohols as well as cyclic alcohols may be less desirably selected. Of particular value are aliphatic ether alcohols in which the hydrocarbon radical between the ether oxygen and the hydroxyl oxygen contains from 2-6 carbon atoms. The specific nature of the etherifying group remote from the single hydroxyl group is not of primary significance. To illustrate the alcohols which may be used to provide plasticizing characteristics while retaining high solubility in aqueous alkaline medium; preferred alcohols are n-amyl alcohol, 1-butanol, isobutanol, 2-ethyl butanol, butyl Cellosolve, butyl Carbitol and tetrahydrofurfuryl alcohol. Butyl Cellosolve is outstanding and is particularly preferred. Other alcohols which may be selected, though these are less preferred, are 1-hexanol, Cellosolve, phenyl Cellosolve, Carbitol, butoxy ethoxy propanol, 2-ethyl hexanol and cyclohexanol. The monovalent radical carrying the hydroxyl group may even contain halogen, nitrogen, sulfur or phosphorus atoms. Thus, halogenated derivatives may be used, as for example, chlorinated or fluorinated isobutanol. Nitrogen-containing monohydroxy organic compounds which may be used are illustrated by tertiary amino alcohols such as N,N-dimethyl ethanol amine. Sulfur-containing monohydroxy compounds which may be used are illustrated by thio ethers such as ethyl butanol sulfide. Phosphorus-containing monohydroxy compounds which may be used are illustrated by diethyl monobutanol phosphate. While saturated alcohols are preferred, saturation is not essential. Thus, unsaturated alcohols may be used such as allyl alcohol, methallyl alcohol, oleyl alcohol and linoleyl alcohol.

As previously indicated, the anhydride copolymer and some of the partially esterified derivatives thereof are soluble in aqueous alkaline medium to form valuable water solutions. These solutions are prepared by dissolving the copolymer or the partially esterified copolymer in water containing dissolved monovalent base, especially ammonium hydroxide, lower alkyl-substituted derivatives of ammonium hydroxide or alkali metal hydroxide or salt which generates the same. Lower alkyl amines and morpholine are also useful. Desirably, sufficient alkaline material is employed to provide a solution having a pH of at least 4.0, preferably in the range of from 7-9. Moderate heat may be used to facilitate dissolving of the copolymer.

Various polyhydric compounds, preferably aliphatic polyhydric alcohols, may be selected when cross-linking is desired. While any polyhydric alcohol is effective as a cross-linking reactant, it is preferred to employ an alcohol which contains at least one primary hydroxyl group for more rapid reaction. Aromatic polyhydric compounds which may be used are illustrated by 2,2'-bis(p-hydroxyphenylpropane).

The polyhydric alcohol and the anhydride copolymer or its reactive partial ester are placed together in physical admixture, preferably in approximately equivalent proportions based on anhydride functionality in the copolymer and hydroxyl functionality in the polyhydric alcohol.

For molding utility, the mixture is desirably a mixture of solids in finely divided form, polyhydric alcohols solid at temperatures of about 15° C. or higher being preferred. Under heat and pressure molding conditions, cross-linking to produce a thermoset molded product takes place at temperatures in the range of from about 130° C. to about 210° C.

Some polyhydric alcohols react rapidly, such as 1,4-butanediol. Other glycols react somewhat slower. Thus, ethylene glycol cross-links at a moderate rate in comparison with 1,4-butanediol. Such glycols as trimethylolethane, trimethyllolphopane, neopentyl glycol, propylene glycol, diethylene glycol, polypropylene glycols, polyethylene glycols, 1,5-pentanediol and hexylene glycol (2-methyl-2,4-pentanediol) cross-link at a rate which is less than that of the fastest material, 1,4-butanediol and greater than that of the slowest material, 2,3-butanediol. 1,1'-isopropylene-bis-(p-phenyleneoxy) di-2-propanol and similar polyhydric products are also useful.

The above polyhydric alcohols are illustrative of those useful in accordance with the invention, and despite their differing rates of reaction, they are all useful.

The physical mixtures of copolymer and polyhydric alcohol may also be present in organic solvent solution medium, in which event, the compositions are useful as coatings and the solidity of the polyhydric alcohol is ordinarily of no importance.

A more complete discussion of physical mixtures of copolymer and polyhydric alcohols and the utility thereof is set forth in my copending application Ser. No. 849,705, filed Oct. 30, 1959, the disclosure of which is hereby incorporated by reference.

With further regard to the physical mixtures of copolymer and polyhydric alcohol which may be formulated in accordance with the invention, the presence of organic compounds having at least one oxirane group provides a desirable plasticizing action as is more fully discussed in my copending application Ser. No. 710,624, filed Jan. 23, 1958. Suitable organic oxirane compounds are those containing the 1-2 oxirane group and are typified by styrene oxide, epichlorohydrin and glycidyl and polyglycidyl ethers of polyhydric alcohols and phenols. These plasticizers may be desirably employed in molding compositions in amounts of 5% by weight or more.

Also and with respect to curable mixtures of polyhydric alcohol and copolymer partial esters, partial esterification, when it is insufficient to overcome thermosetting reactivity of the copolymer with glycol, can be combined with the use of methylol compounds or amines, all as more extensively described in my copending application Ser. No. 30,060, filed May 19, 1960. These combinations may be used in water solution coating compositions and also in organic solvent solution coating compositions. As explained in said application Ser. No. 30,060, various methylol compounds including formaldehyde can be used in proportions to supply at least 0.5 methylol group per maleic residue in the copolymer. In place of the methylol compound, an organic amine of low volatility (e.g., an amine boiling in the range of 100-300° C. such as monoethanolamine) can be used in amounts of at least 0.5 mol of the amine for each equivalent of unesterified maleic residue in the copolymer.

As should now be evident, the invention includes new copolymers which may be thermoset with glycols. When the proportion of excess styrene is not unduly high, a limited amount of partial esterification can be carried out to obtain products which retain their capacity to thermoset with glycols under normal curing conditions and these are useful as solid mixtures and also in the form of solutions in either aqueous alkaline medium or some organic solvents. With larger proportions of styrene or when partial esterification is carried out to a somewhat greater extent, the capacity to thermoset with glycols under normay curing conditions is lost, but thermoplastic materials of enhanced utility are obtained. These are useful in diverse ways and may be applied from aqueous alkaline medium or from organic solvent solution. When partial esterification is carried out to a sufficient extent, solubility in aqueous alkaline medium is reduced, but the products remain useful for application from organic solvent medium.

Various organic solvents are useful for forming solvent solutions of the copolymers of the invention, these being illustrated by acetone, cyclohexanone, dimethyl formamide, and other similar solvents having a strong solvating action. Proportions of aromatic hydrocarbon solvents such as toluene an xylene may be included, this being a feature of the invention. The presence of larger proportions of vinyl aromatic compound such as styrene in the copolymer enhances its solubility, thus increasing organic solvent solution utility.

The present invention primarily contemplates copolymers constituted by two copolymerizable components as explained hereinbefore. However, copolymers in accordance with the invention may, optionally, include minor proportions up to about 20 mol percent of other monoethylenically unsaturated monomers which do not significantly alter the tendency to heteropolymerize in the absence of the invention. The presence of such relatively minor proportions of other monomers does not significantly alter the problem of the invention or the results achieved thereby.

The invention is illustrated in the examples which follow:

Example 1

A copolymer containing a larger proportion of styrene than was previously considered to be possible in copolymers of the type under consideration is made by copolymerizing one mol of maleic anhydride with 2 mols of styrene in the presence of an organic peroxide catalyst. The equipment used in this copolymerization is a 2-liter resin kettle fitted with an electric heating mantle, reflux condenser, thermometer, stirrer and separatory funnel.

To carry out the copolymerization, 633 milliliters of p-cymene are added to the resin kettle and heat is applied to bring the p-cymene to reflux temperature (boiling point 176° C.). Then a previously prepared "Solution A" is added to the resin kettle by incremental addition through the separatory funnel over a period of one hour. Enough heat is applied to the reaction mixture by means of the heating mantle to maintain the reaction temperature at 175–176° C. "Solution A" is maintained at 40–50° C. during the one hour addition period.

"Solution A" is prepared by dissolving 122.75 grams of maleic anhydride in 710 milliliters of p-cymene at 60° C. After filtering, 262 grams of styrene and 12 grams of benzoyl peroxide are added to provide the final "Solution A."

During the addition of "Solution A," a molten mass of copolymer product forms in the kettle. When addition of "Solution A" is complete, the reaction mixture is allowed to cool and additional anhydride copolymer crystallizes out of the solvent phase. The solvent is distilled off leaving a mass of solid copolymer which is mortar mixed, washed with petroleum ether, and then suction filtered. This procedure is repeated until additional purification removes no further solvent. The washed copolymer is then dried in an oven at 110–120° C. The yield is at least stoichiometric indicating complete incorporation of styrene in the copolymer product.

The styrene-maleic anhydride copolymer product made by the above procedure has the following analyses:

Solution viscosity (10% solution in acetone),
centistokes at 30° C. _____ 0.721
Melting range, ° C. _____ 150–155
Acid number _____ 365

The fact of complete solubility of the copolymer product in aqueous alkaline medium as well as the acid number of the copolymer establishes the absence of styrene homopolymer.

The copolymer product of this example is useful in admixture with a stoichiometric proportion of 1,4-butanediol to form a molding powder. Moreover, the mixture may be dissolved in various organic solvents to form coating solutions which thermoset when baked.

The copolymerization described in Example 1 was repeated a number of times to provide the following average data:

Solution viscosity (10% solution in acetone),
centistokes at 30° C. _____ 0.70–0.73
Melting range, ° C. _____ 145–155
Acid number _____ 365–370

Example 2

An attempt was made to repeat Example 1 using the normal procedure of the prior art in which the solvent is typically benzene and the copolymerization is conducted by subjecting "Solution A" directly to a temperature of 80° C. (the reflux temperature of the benzene solvent). Instead of producing a copolymer such as that produced in Example 1, a completely different copolymer was produced which contained from 1.25–1.5 mols of styrene per mol of maleic anhydride. The product had a higher solution viscosity (5.31 centistokes vs. 0.72 centistoke); a much higher acid number (477 vs. 365); and a melting range of 180–210° C. vs. 145–155° C. The excess styrene which was present in the monomer solution and which refused to enter the copolymer was found to be present in the benzene solvent after removal of the copolymer.

Example 3

The 25% half-ester of the copolymer of Example 1 is prepared by mixing 1 anhydride equivalent of the copolymer and 0.25 mol of butyl Cellosolve in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 25% half-ester is ground to a free flowing powder.

Example 4

The 100% half-ester is prepared by mixing one anhydride equivalent of the copolymer of Example 1 and 1 mol of butyl Cellosolve with 2.4 gram $LiC_2H_3O_2 \cdot 2H_2O$ in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 100% half-ester is ground to a free-flowing powder.

Example 5

The 125% half-ester of the copolymer of Example 1 and butyl Cellosolve may be prepared by mixing 1 anhydride equivalent of the copolymer of Example 1 and 1.25 mol butyl Cellosolve with 2.62 gram $LiC_2H_3O_2 \cdot 2H_2O$ in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 125% half-ester is ground to a powder.

Example 6

25 parts of the 25% half-ester of Example 3 are agitated in 75 parts of water containing 1 mol of ammonium hydroxide per equivalent of carboxyl functionality remaining in the partially esterified copolymer. The mixture is heated to 50° C. and agitation is continued until the partially esterified copolymer powder is dissolved to provide a 25% by weight solution. A stoichiometric proportion of water soluble diol such as ethylene glycol can be added to the aqueous solution to provide a water solution coating composition which thermosets when baked.

Example 7

25 parts of the 100% half-ester of Example 4 are agitated in 75 parts of water containing 1 mol of ammonium hydroxide per equivalent of carboxyl functionality remaining in the partially esterified copolymer. The mixture is heated to 50° C. and agitation is continued until the partially esterified copolymer powder is dissolved to provide a 25% by weight solution.

This water solution is useful for diverse purposes as is more fully discussed in my copending application Ser. No. 129,981 filed of even date herewith.

Example 8

20 parts of the 125% half-ester of Example 5 are agitated with 80 parts of water containing 2 mols of ammonium hydroxide per equivalent of carboxyl functionality remaining in the partially esterified copolymer, the aqueous medium being further diluted and heated to 50° C. to facilitate dissolving of the copolymer.

Repeating Examples 3–8, inclusive, using n-butanol, isobutanol, butyl Carbitol, dodecyl alcohol and isooctyl alcohol in place of butyl Cellosolve in Examples 3, 4 and 5 provides substantially the same results.

Example 9

A copolymer is prepared by copolymerizing 1 mol of maleic anhydride with 3 mols of styrene in the presence of an organic peroxide catalyst. The equipment used in this copolymerization is a 2-liter resin kettle fitted with an electric heating mantle, reflux condenser, thermometer, stirrer and separatory funnel.

To carry out the copolymerization, 633 milliliters of p-cymene are added to the resin kettle and heat is applied to bring the p-cymene to reflux temperature (boiling point 176° C.). Then a previously prepared "Solution A" is added to the resin kettle by incremental addition through the separatory funnel over a period of one hour. Enough heat is applied to the reaction mixture by means of the heating mantle to maintain the reaction temperature at 175–176° C. "Solution A" is maintained at approximately 40° C. during the one hour addition period.

"Solution A" is prepared by dissolving 122.75 grams of maleic anhydride in 710 milliliters of p-cymene at 60° C. After filtering, 393 grams of styrene and 12 grams of benzoyl peroxide are added to provide the final "Solution A."

During the addition of "Solution A," a copolymer product is formed substantially instantaneously, and remains in solution. When addition of "Solution A" is complete, the reaction mixture is allowed to cool and styrene-maleic anhydride copolymer crystallizes in part out of the solvent phase. The solvent is distilled off, leaving a mass of solid copolymer which is mortar mixed, washed with petroleum ether, and then suction filtered. This procedure is repeated until additional purification removes no further solvent. The washed copolymer is then dried in an oven at 110–120° C. The yield is at least stoichiometric indicating complete incorporation of styrene in the copolymer product in a mol ratio of 3:1.

The styrene-maleic anhydride copolymer product made by the above procedure has the following analyses:

Solution viscosity (10% solution in acetone), centistokes at 30° C. _____ 0.801
Melting range, ° C. _____ 130–135
Acid number _____ 275

The complete solubility of the copolymer product in aqueous alkaline medium and its acid number establish the absence of styrene homopolymer.

The copolymerization described in the present example was repeated a number of times to provide the following average data:

Solution viscosity (10% solution in acetone), centistokes at 30° C. _____ 0.8–0.84
Melting range, ° C. _____ 125–135
Acid number _____ 270–280

Example 10

An attempt was made to repeat Example 9 using the normal procedure of the prior art in which the solvent is typically benzene and the copolymerization is conducted by subjecting "Solution A" directly to a temperature of 80° C. (the reflux temperature of the benzene solvent). Instead of producing a copolymer such as that produced in Example 9, a completely different copolymer was produced which contained from 1.25–1.5 mols of styrene per mol of maleic anhydride. The product had a higher solution viscosity (5.31 centistokes vs. .82 centistoke); a much higher acid number (416 vs. 275); and a melting range of 180–200° C. vs. 125–135° C. The excess styrene which was present in the monomer solution and which refused to enter the copolymer was found to be present in the benzene solvent after removal of the copolymer. It is interesting to note that essentially the same product was obtained when 2 mols of styrene per mol of maleic anhydride was used, as in Example 2, even though 3 mols of styrene per mol of maleic anhydride was used in the present example.

Monoethylenically unsaturated monomers having a strong tendency to heteropolymerize are defined herein as those monomers which, when copolymerized as described in Example 10, do not form polymers containing more than 1.9 mols of the heteropolymerizing monomer per mol of the maleic compound which is used, e.g., maleic anhydride.

Example 11

The 50% half-ester is prepared by mixing one anhydride equivalent of the copolymer of Example 9 and 0.5 mol of butyl Cellosolve in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 50% half-ester is ground to a free-flowing powder.

Example 12

The 100% half-ester is prepared by mixing 1 anhydride equivalent of the copolymer of Example 9 and 1 mole of butyl Cellosolve with 2.4 grams $LiC_2H_3O_2 \cdot 2H_2O$ is a 2-liter resin kettle fitted with a stirrer and reflux condenser. The mixture is heated in an oil bath at 175° C. for 2 hours. The resulting ester is then sparged with nitrogen for approximately 10 minutes. After cooling, the 100% half-ester is ground to a free-flowing powder.

Example 13

20 parts of the 50% half-ester of Example 11 are agitated with 80 parts of water containing 1 mol of ammonium hydroxide per equivalent of carboxyl functionality remaining in the partially esterified copolymer. The mixture is heated to 50° C. and agitation is continued until the partially esterified copolymer powder is dissolved to provide a 20% by weight solution.

This water solution is useful for diverse purposes as is more fully discussed in my copending application Ser. No. 129,981 filed of even date herewith.

Example 14

15 parts of the 100% half-ester of Example 12 are agitated with 85 parts of water containing 2 mols of ammonium hydroxide per equivalent of carboxyl functionality remaining in the partially esterified copolymer, the aqueous medium being heated to 50° C. to facilitate dissolving of the copolymer. The partially esterified copolymer has limited solubility.

While the 100% half-ester of the present example is not extensively soluble in aqueous alkaline medium it is, nevertheless, useful for coating when applied from organic solvent medium.

Repeating Examples 11–14, inclusive, using n-butanol, isobutanol, butyl Carbitol, dodecyl alcohol and isooctyl alcohol in place of butyl Cellosolve in Examples 11 and 12 provides substantially the same results.

Example 15

The present example illustrates the production of styrene-maleic anhydride copolymer containing copolymerized styrene and maleic anhydride in a mol ratio of substantially 5:1.

The "Solution A" used in the present example is prepared by dissolving 122.75 grams of maleic anhydride in 707 milliliters of p-cymene at 60° C. After filtering, 655 grams of styrene and 12 grams of dicumyl peroxide are added and thoroughly blended to provide the final "Solution A."

The equipment used in the copolymerization is a 2-liter resin kettle fitted with an electric heating mantle, reflux condenser, thermometer, stirrer and separatory funnel.

To carry out the copolymerization, 633 milliliters of p-cymene are added to the resin kettle and heat is applied to bring the p-cymene to reflux temperature (boiling point 176° C.). Then the previously prepared "Solution A" is added to the resin kettle by incremental addition through the separatory funnel over a period of one hour. Enough heat is applied to the reaction mixture by means of the heating mantle to maintain the reaction temperature at 175–176° C. throughout the reaction. "Solution A" is maintained at approximately 40° C. during the one hour addition period.

During the addition of "Solution A," a copolymer product is formed substantially instantaneously, and remains in solution. When addition of "Solution A" is complete, the reaction mixture is allowed to cool and the styrene/maleic anhydride copolymer is precipitated from the solution by the addition of petroleum ether. The solid copolymer is filtered with the aid of suction, washed with additional petroleum ether until free of the p-cymene solvent and filtered. The washed copolymer is dried in an oven at 90–95° C. The yield is at least stoichiometric indicating complete incorporation of styrene in the copolymer product in a mol ratio of 5:1.

The styrene/maleic anhydride copolymer product made by the above procedure has the following analyses:

Solution viscosity (10% solution in acetone),
 centistokes at 30° C. _____ 0.718
Melting range, ° C. _____ 100–115
Acid number _____ 170
Theoretical acid number _____ 184

Example 16

The present example illustrates the production of styrene-maleic anhydride copolymer containing copolymerized styrene and maleic anhydride in a mol ratio of substantially 10:1.

The "Solution A" used in the present example is prepared by dissolving 122.75 grams of maleic anhydride in 707 milliliters of p-cymene at 60° C. After filtering, 1310 grams of styrene and 12 grams of dicumyl peroxide are added and thoroughly blended to provide the final "Solution A."

The equipment used in the copolymerization is a 2-liter resin kettle fitted with an electric heating mantle, reflux condenser, thermometer, stirrer and separatory funnel.

To carry out the copolymerization, 633 milliliters of p-cymene are added to the resin kettle and heat is applied to bring the p-cymene to reflux temperature (boiling point 176° C.). Then the previously prepared "Solution A" is added to the resin kettle by incremental addition through the separatory funnel over a period of one hour. Enough heat is applied to the reaction mixture by means of the heating mantle to maintain the reaction temperature at 175–176° C. throughout the reaction. "Solution A" is maintained at approximately 40° C. during the one hour addition period.

During the addition of "Solution A," a copolymer product is formed substantially instantaneously, and remains in solution. When addition of "Solution A" is complete, the reaction mixture is allowed to cool and the styrene/maleic anhydride copolymer is precipitated from the solution by the addition of petroleum ether. The solid copolymer is filtered with the aid of suction, washed with additional petroleum ether until free of the p-cymene solvent and filtered. The washed copolymer is dried in an oven at 90–95° C. The yield is at least stoichiometric indicating complete incorporation of styrene in the copolymer product in a mol ratio of 101.

The styrene/maleic anhydride copolymer product made by the above procedure has the following analyses:

Solution viscosity (10% solution in acetone),
 centistokes at 30° C. _____ 1.42
Melting range, ° C. _____ 130–160
Acid number _____ 96
Theoretical acid number _____ 101

Example 17

The present example illustrates the production of styrene-maleic anhydride copolymer containing copolymerized styrene and maleic anhydride in a mol ratio of substantially 20:1.

The "Solution A" used in the present example is prepared by dissolving 122.75 grams of maleic anhydride in 707 milliliters of p-cymene at 60° C. After filtering, 2620 grams of styrene and 12 grams dicumyl peroxide are added and thoroughly blended to provide the final "Solution A."

The equipment used in the copolymerization is a 2-liter resin kettle fitted with an electric heating mantle, reflux condenser, thermometer, stirrer and separatory funnel.

To carry out the copolymerization, 633 milliliters of p-cymene are added to the resin kettle and heat is applied to bring the p-cymene to reflux temperature (boiling point 176° C.). Then the previously prepared "Solution A" is added to the resin kettle by incremental addition through the separatory funnel over a period of one hour. Enough heat is applied to the reaction mixture by means of the heating mantle to maintain the reaction temperature at 175–176° C. throughout the reaction. "Solution A" is maintained at approximately 40° C. during the one hour addition period.

During the addition of "Solution A," a copolymer product is formed substantially instantaneously, and remains in solution. When addition of "Solution A" is complete, the reaction mixture is allowed to cool and the styrene/maleic anhydride copolymer is precipitated from solution by addition of petroleum ether. The solid copolymer is filtered with the aid of suction, then washed with additional petroleum ether until free of the p-cymene solvent and then filtered. The washed copolymer is then dried in an oven at 90–95° C. The yield is at least stoichiometric indicating complete incorporation of styrene in the copolymer product in a mol ratio of 20:1.

The styrene/maleic anhydride copolymer product made by the above procedure has the following analyses:

Solution viscosity (10% solution in acetone),
 centistokes at 30° C. _____ 1.25
Melting range, ° C. _____ 110–120
Acid number _____ 47
Theoretical acid number _____ 52

The invention is defined in the claims which follow.

I claim:

1. A method of producing copolymers of maleic compound and monoethylenically unsaturated monomer having a strong tendency to heteropolymerize therewith, said copolymers containing at least 2.0 mols of said monoethylenically unsaturated monomer per mol of maleic compound and having a solution viscosity in 10% solution in acetone of up to 2.0 centistokes, comprising simultaneously adding said monoethylenically unsaturated monomer and said maleic compound in molar proportions of at least 2:1 and free-radical generating polymerization catalyst to an organic solvent maintained at a polymerization temperature of at least 120° C., said organic solvent being a solvent for said unsaturated monomer and said maleic compound and containing less than 3% by weight of total polymerizable monomer, whereby said unsaturated monomer and said maleic compound are caused to copolymerize at temperatures of at least 120° C.

2. A method as recited in claim 1 in which said unsaturated monomer and said maleic compound are supplied in a concentration of at least 5% by weight and at a rate which does not substantially exceed the rate at which said unsaturated monomer and said maleic compound are removed from the system by copolymerization.

3. A method of producing copolymers of maleic anhydride and styrene, said copolymers containing at least 2.0 mols of styrene per mol of maleic anhydride and having a solution viscosity in 10% solution in acetone of up to 2.0 centistokes, comprising simultaneously adding said styrene and said maleic anhydride in molar proportions of at least 2:1 and free-radical generating polymerization catalyst to an organic solvent maintained at a polymerization temperature of at least 120° C., said organic solvent being a solvent for said styrene and said maleic anhydride and containing less than 3% by weight of total polymerizable monomer, whereby said styrene and said maleic anhydride are caused to copolymerize at temperatures of at least 120° C.

4. A method as recited in claim 1 in which said organic solvent is maintained at a polymerization temperature of at least 140° C.

5. Copolymers produced by the process of claim 1.

6. Copolymers as recited in claim 5 in which said copolymers are terminated by an alkyl-substituted benzene.

7. Copolymers as recited in claim 5 in which said copolymers are esterified with monohydroxy organic compound to an extent of at least 10% of half esterification.

8. In physical admixture, copolymers produced by the process of claim 1 in which said maleic compound is maleic anhydride and in which the copolymers contain more than 2.0 anhydride groups per copolymer molecule, and polyhydric alcohol.

9. A mixture as recited in claim 8 in which said copolymers and said polyhydric alcohol are dissolved in organic solvent medium.

10. A mixture as recited in claim 8 in which said copolymers are dissolved in aqueous alkaline medium and said polyhydric alcohol is contained in the aqueous copolymer solution.

11. A mixture as recited in claim 8 in which said copolymers are partially esterified with organic monohydroxy compound to an extent of at least 10% of half esterification and the copolymer ester contains more than 2.0 anhydride groups per copolymer molecule.

12. A mixture as recited in claim 11 in which said copolymers and said polyhydric alcohol are dissolved in organic solvent medium.

13. A mixture as recited in claim 11 in which said copolymers are dissolved in aqueous alkaline medium and said polyhydric alcohol is contained in the aqueous copolymer solution.

14. An organic solvent solution comprising organic solvent having dissolved therein a copolymer produced as recited in claim 1, said copolymer being at least partially esterified with organic monohydroxy compound to an extent of at least 100% of half esterification.

15. Copolymers consisting essentially of monovinyl aromatic compound selected from the group consisting of styrene and vinyl toluene and maleic anhydride in molar proportions of from 2 to 20 mols of said monovinyl aromatic compound per mol of maleic anhydride, said copolymers having a solution viscosity at 30° C. in 10% solution in acetone of up to 2.0 centistokes and being capable of being retained in solution in aqueous alkaline medium at pH 7–9 at room temperature and being substantially free of homopolymer components.

16. Copolymers as recited in claim 15 in which said copolymers are terminated by an alkyl-substituted benzene.

17. Copolymers consisting essentially of styrene and maleic anhydride in molar proportions of from 2 to 20 mols of styrene per mol of maleic anhydride, said copolymers having a solution viscosity at 30° C. in 10% solution in acetone of up to 1.0 centistoke and being capable of being retained in solution in aqueous alkaline medium at pH 7–9 at room temperature and being substantially free of homopolymer components.

18. The copolymers of claim 17 esterified with monohydroxy organic compound to an extent of at least 10% of half esterification.

19. In physical admixture, the copolymers of claim 17 and polyhydric alcohol.

References Cited
UNITED STATES PATENTS

| | | | |
|---|---|---|---|
| 2,606,891 | 8/1952 | Rowland | 260—78.5 |
| 2,866,771 | 12/1958 | Sellers | 260—78.5 |
| 2,912,413 | 11/1959 | Baer | 260—78.5 |
| 2,971,939 | 2/1961 | Baer | 260—78.5 |
| 3,207,718 | 9/1965 | Zimmerman et al. | 260—78.5 |

JOSEPH L. SCHOFER, *Primary Examiner.*

JAMES A. SEIDLECK, *Examiner.*

L. WOLF, L. G. CHILDERS, *Assistant Examiners.*